Nov. 9, 1937.  E. J. DILLMAN  2,098,912
CONTROL DEVICE FOR HEATING SYSTEMS
Filed April 22, 1935  3 Sheets—Sheet 1
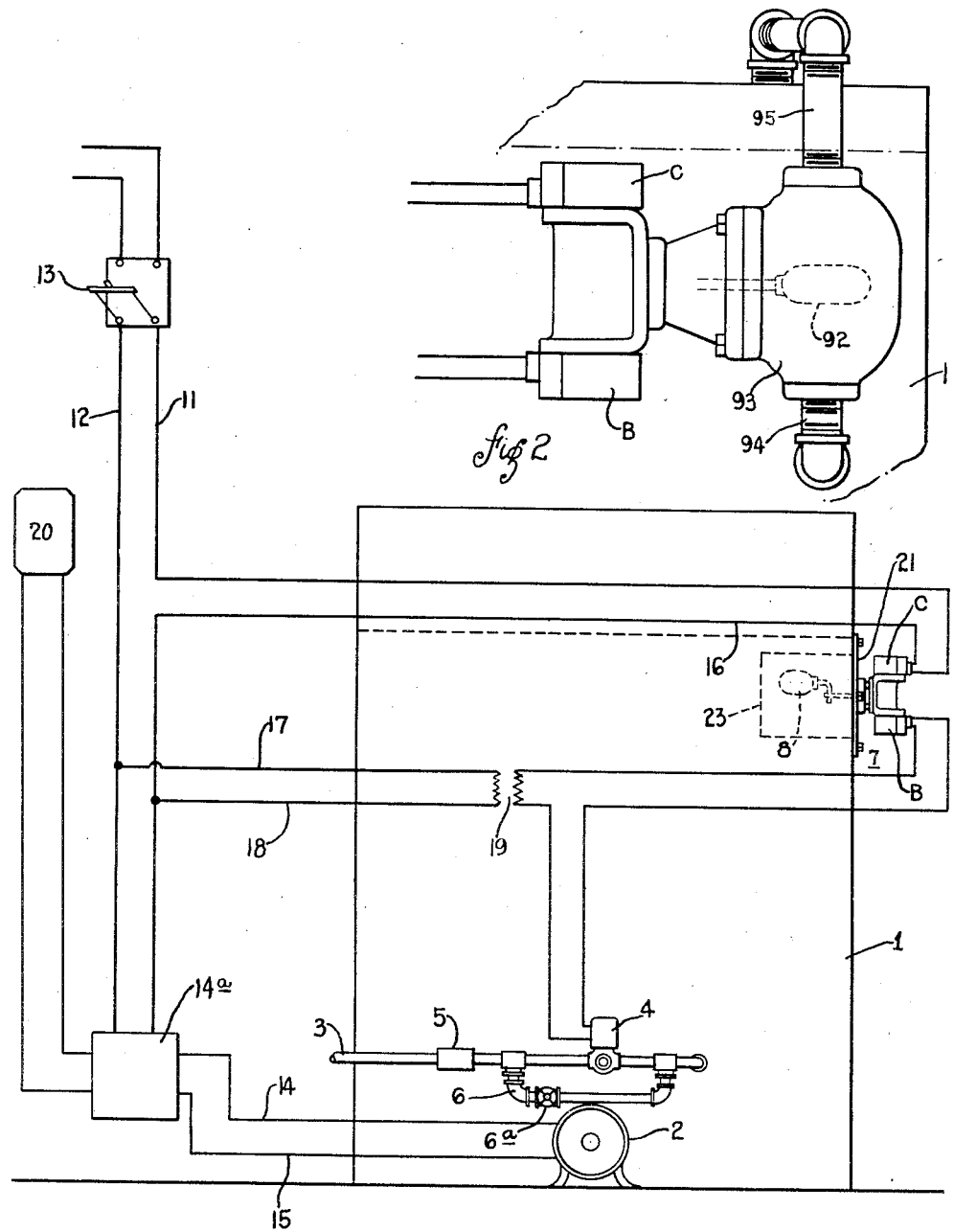
INVENTOR
Earnest J. Dillman
BY
Andrew K. Foulds
his ATTORNEY

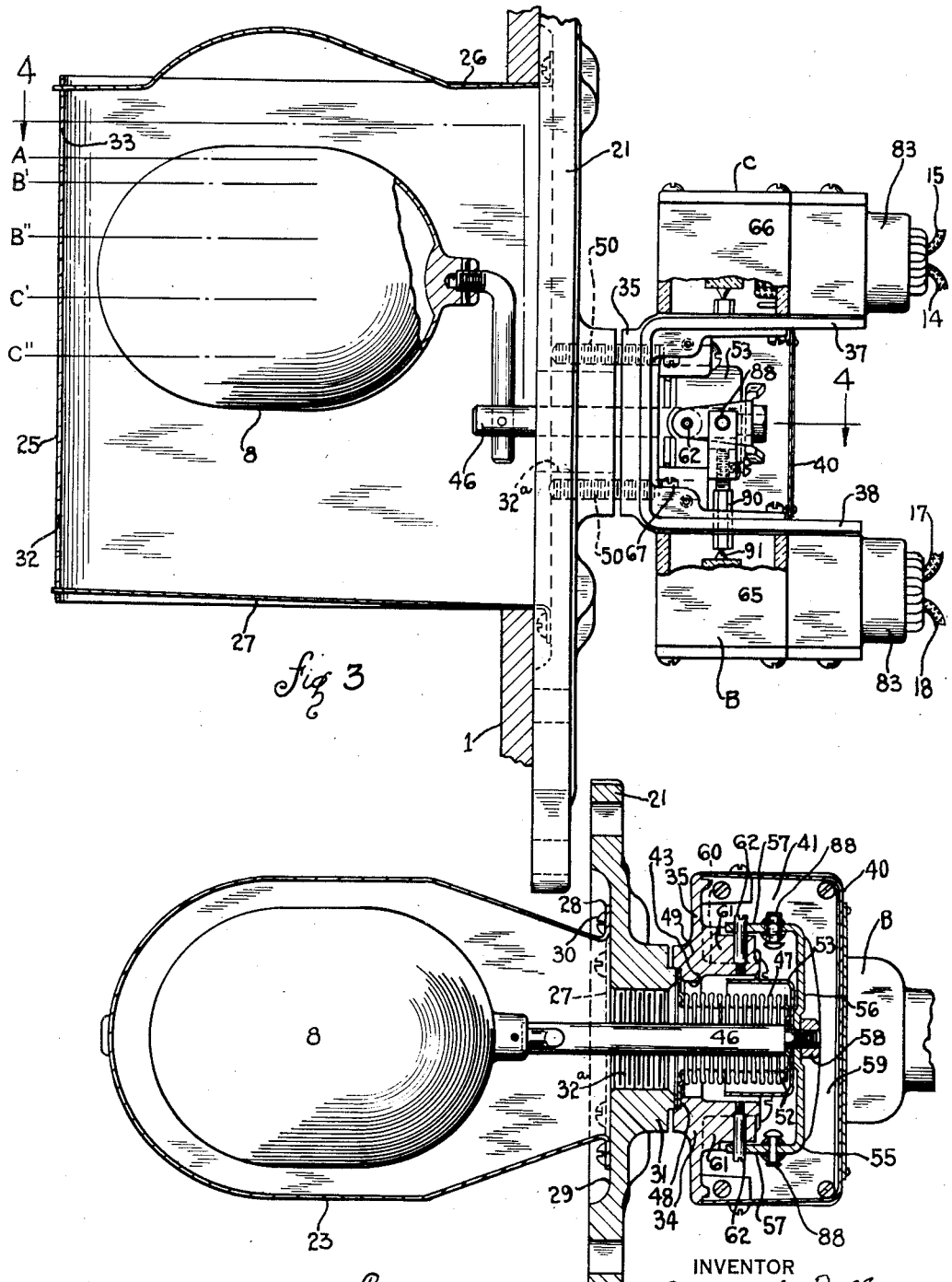

Nov. 9, 1937.  E. J. DILLMAN  2,098,912
CONTROL DEVICE FOR HEATING SYSTEMS
Filed April 22, 1935  3 Sheets-Sheet 3

INVENTOR
Earnest J. Dillman
BY Andrew K. Foulds
his ATTORNEY

Patented Nov. 9, 1937

2,098,912

UNITED STATES PATENT OFFICE 2,098,912

CONTROL DEVICE FOR HEATING SYSTEMS

Earnest J. Dillman, Detroit, Mich., assignor to Detroit Lubricator Company, Detroit, Mich., a corporation of Michigan Application April 22, 1935, Serial No. 17,631

8 Claims. (Cl. 122—448)

My invention relates generally to heating systems and more particularly to control devices for such systems.

One of the objects of my invention is to provide a new and improved heating system having provision for controlling both the supplying of heat to the boiler and the supplying of water to the boiler in accordance with variations in the level of the water in the boiler.

Another object of my invention is to provide new and improved control mechanism for heating systems for controlling the supplying of water to the boiler of a system and for stopping the supplying of heat to the boiler upon a decrease in the level of the water therein to a predetermined point of safety.

Another object of my invention is to provide a control device of the character which is responsive to changes in the liquid level in a liquid container and to provide a device of this character having a new and improved arrangement of the operating parts thereof.

While the invention is capable of wide use for the control of combustion in a heating system and for controlling the supplying of water to the boiler in a system, it will be particularly useful for controlling the combustion of an oil burner or fire stoker applied to a heating system. For example, it may be employed to control a supply of oil, or a supply of air and oil, or other fuel to a burner and to stop such supply when the water level in the boiler decreases below a predetermined point of safety and while the control devices shown are described as being controlled by changes in liquid level in the boiler, it will be understood that devices responsive to boiler pressure or temperature could be employed, if desired.

The invention consists in the improvements to be more fully described hereinafter, and the novelty of which will be particularly pointed out and distinctly claimed.

In the accompanying drawings, I have fully and clearly illustrated certain preferred embodiments of my invention and in which drawings—

Figure 1 is a diagrammatic view of a heating system embodying my invention;

Figure 2 is a fragmentary view of a modified form of the system shown in Fig. 1 and embodying features of my invention;

Figure 3 is an enlarged view shown partly in cross-section and partly in elevation of a control device employed in the system of Fig. 1 and embodying features of my invention;

Figure 4 is a view shown in cross-section taken along the line 4—4 of Fig. 3.

Figure 5:
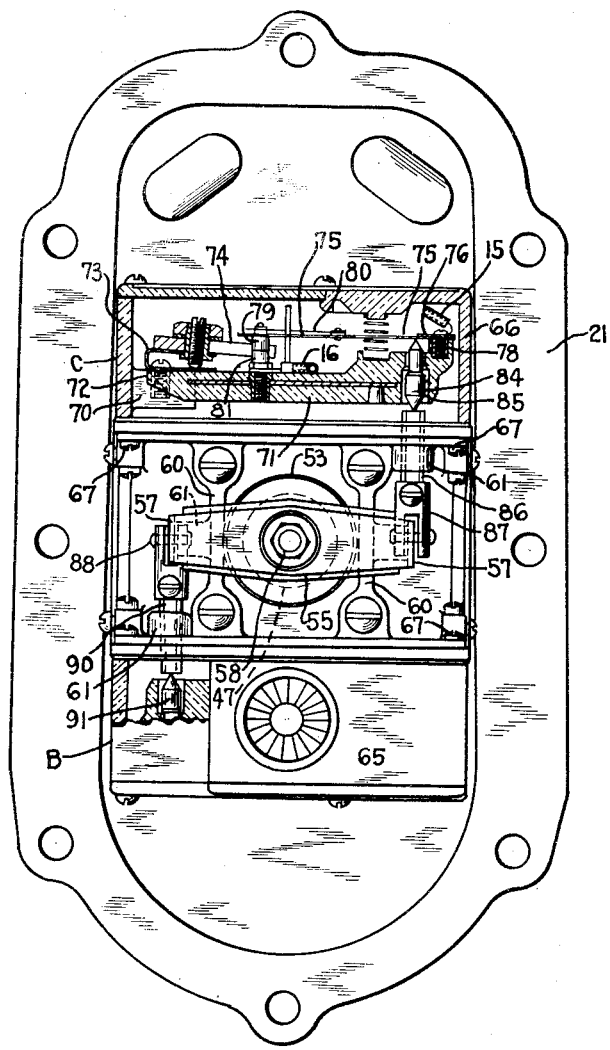
Figure 5 is a view taken in the direction of the arrows 5—5 of Fig. 3.

Referring to the drawings, and more particularly to Fig. 1, there is shown a heating system which includes a boiler 1 and a heat supplying means therefor which may be a fuel stoker or oil burner preferably operated by an electric motor 2. The system also includes a water supplying means of which only the water feed pipe, indicated at 3, is shown and through which water is supplied to the boiler 1 when necessary. In the water feed pipe or conduit 3, there is provided a control device 4 for controlling flow of water to the boiler and also in the feed pipe there may be provided a strainer, indicated at 5 and preferably located, as shown, between the source of water supply and the control device 4. The control device 4 may be of any suitable type, and is preferably an electrically operated device, such as, a solenoid valve. In the present instance, the valve of the control device 4 is opened permitting flow of water to the boiler 1 when the solenoid is energized and closed upon deenergization of the solenoid to stop flow or admittance of water to the boiler. A by-pass pipe 6 is provided in the feed pipe 3 for by-passing water around the solenoid valve 4 to the boiler 1, and flow through the by-pass pipe may be controlled by a hand operated valve 6ª, the purpose of the by-pass being hereafter described.

The heating system also includes a control device, designated generally by the numeral 7 and which control device is, in the present instance, of the float controlled type. The float, indicated at 8, is operable in response to changes in the level of the water in the boiler 1 to control the operation of both the burner motor 2 and the water supply control device or valve 4. Associated with the float mechanism, there is provided a switch means, designated in general by the letter B and a second switch means designated by the letter C, both of which are controlled or actuated by the float to control actuation of the solenoid valve 4 and the burner motor 2, respectively. The burner motor 2 may be operated from the usual 110 volt line to which are connected primary lead wires 11 and 12 and in which there may be provided a manually operable 13. A control device, such as a relay indicated at 14ª is provided in circuit in the wires 11 and 12 and from the relay, lead wires 14 and 15 connect the burner motor 2 in series therewith. The switch means C is in series circuit with the burner motor 2 and is operatively connected to the relay 14ª by means of the lead wires 11, 12 and 16 and therefore controls the operation of the motor. The switch means B is operatively connected in parallel circuit with the burner motor 2 by means of a lead wire 17 connected to lead wire 12 and a lead wire 18 connected to lead wire 16 of the switch means C. In the lead wires 17 and 18 there is preferably provided a transformer 19 to provide a low voltage current for operating the solenoid valve 4. The switch means B has a lead wire connected to the secondary of the transformer 19 and a lead wire connected to the solenoid from which a lead wire connects the solenoid to the secondary of the transformer. Thus, since the solenoid is in parallel circuit with the burner motor 2, the solenoid will be deenergized as well as the motor 2 when the circuit is opened to the motor. The numeral 20 designates a room thermostat connected to the relay 14a to cut in and cut out the motor 2 to maintain a predetermined room temperature.

In the system shown in Fig. 1, the float mechanism and the associated switch means B and C are mounted on a wall of the boiler 1 with the float 8 projecting into the interior of the boiler. Referring now to Figs. 3, 4 and 5 in which the detail construction of the float mechanism and the associated switch means B and C is shown, the structure includes a supporting means in the form of a plate 21 which is fixed to the outer wall of the boiler 1 by means of bolts or other suitable securing means. The plate 21 closes an opening in the wall of the boiler 1 provided to receive a casing or housing 23 which projects therethrough into the interior of the boiler and encloses the float 8. The casing 23 is constructed, in the present instance, of sheet metal and comprises a shell or sleeve-like member 25 closed at the top by a plate 26 and at the bottom by a second plate 27. The sleeve or shell 25 is of substantially U-shaped cross-section, as shown in Fig. 4, and opposite sides of the U-shaped sleeve are formed with outturned flange portions 28 for bearing against the inner wall of the plate 21 which is preferably recessed as at 29. Screws 30, or other suitable attaching means, may be used for rigidly securing the casing 23 to the plate 21. In a wall of the casing 23 and preferably in a substantially vertical wall of the casing there is provided an aperture 32 adjacent the bottom of the casing and a second aperture 33 adjacent the top of the casing for the passage of water in and out of the float casing in accordance with variations in the liquid level of the water in the boiler 1. By providing relatively small apertures in the casing 23 and by locating them in a vertical or substantially vertical wall of the casing, water will flow in and out of the casing 23 without the transmission of the motion of the surging boiler water to the water within the casing 23 and therefor without transmission of such motion to the float 8.

The plate 21 is formed with an outwardly extending proturberance 31 which is in alignment with the casing 23 and which has a centrally disposed opening 32a therethrough opening through the plate 21 into the float chamber or interior of the casing 23. Mounted on the outer wall of the plate 21 there is a supporting means in the form of a housing which includes an end wall member or bracket 34 which may be in the form of a casting, as shown. The supporting means 34 has an end wall portion 35 disposed toward the end wall of the protuberance 31, and extending rearwardly from the wall 35 at the top and bottom thereof are oppositely disposed and substantially parallel flanges 37 and 38, the bracket or supporting means 34 thus having the form of a U-shaped channel member, as shown more clearly in Fig. 4. The U-shaped edges of the ends of the channel-shaped portion are preferably formed around the inner walls with an offset or recessed portion for receiving the oppositely disposed sides of a three-sided closure member or cover 40. The cover 40 cooperates with the inner walls of the flanges 37 and 38 and the wall 35 to provide a chamber 41 and the cover may be secured to the U-shaped channel portion by means of screws.

Through the wall 35 of the supporting means 34 there is provided an opening 43 in alignment with the opening 32a in the plate 21, and extending through the aligned opening 43 and 32a and into chamber 41 is one end of a lever 46, the other end of which is rigidly fixed to the float 8. A movable sealing means is provided for closing and sealing the opening between the chamber 41 and the boiler 1 and the sealing means may be of any suitable type, such as a substantially cylindrical, circumferentially corrugated, resilient, metallic bellows 47. The bellows 47 has one end secured and hermetically sealed to a ring-like end wall member 48, which member is tightly clamped between the outer end wall of the proturberance 31 and an extended portion 49 of the wall 35 of the supporting means 34. The outer end wall of the extended portion is recessed providing an outwardly facing annular shoulder or seating surface against which the ring-like end wall 48 of the bellows bears. The outer end wall of the protuberance 31 is formed with a reduced and extended portion which extends into the recess in the wall 35 and bears against the adjacent side of the ring-like end wall 48 of the bellows 47. The supporting means 34 and the plate member 21 may be secured together by means of screws 50 and the end wall 48 of the bellows may be tightly clamped therebetween. The bellows 47 surrounds the float arm 46 and extends into the chamber 41, the inner end being secured and hermetically sealed to a plate 52 which is centrally apertured to receive a reduced portion of the lever 46 which reduced portion projects through and extends beyond the outer wall of the plate 52. A shield 53 in the form of a cap member is provided and has a central aperture for receiving the reduced end of the lever 46, and the cup-shaped shield 53 surrounds the bellows 47 and extends toward the wall 35 of the supporting means 34.

A yoke or U-shaped bracket 55 is provided and is fixed to the outer end of the lever 46 and within chamber 41. The yoke 55 has a side 56 which extends transverse to the lever 46 and oppositely disposed arms or flanges 57 which extend on opposite sides of the lever and inwardly or toward the float 8. The side 56 of the lever is provided with an aperture between the oppositely disposed sides or flanges 57 for receiving the reduced portion of the lever 46 which portion is threaded for threaded engagement with a nut 58 by means of which the yoke, shield and end wall of the bellows may be tightly clamped against the shoulder, formed on the rod by the reduced portion, and thereby be rigidly secured to the end of the lever.

On opposite sides of the bellows 47 are vertically disposed ribs 60 which extend from the wall 35 of the supporting means 34, rearwardly or into the chamber 41. The ribs 60 are formed with outwardly and oppositely extending bosses 61 having aligned apertures for receiving pins 62 for pivotally supporting the yoke 55. In the oppositely disposed sides 57, of the yoke, and adjacent the ends thereof are provided aligned apertures for receiving the pins 62 which pins may be screw-threaded or otherwise suitably fixed to the bosses 61. Preferably the pivot pins 62 are located in the same horizonal plane as the longitudinal axis of the lever 46 and bellows 47 and preferably at a point substantially midway between the ends of the bellows. By locating the pivot point of the lever 46 at a point substantially midway between the ends of the bellows, the bellows will bend at their natural bending point upon pivotal movement of the lever 46.

Mounted on the upper flange 37 of the supporting means 34 is the electric switch means C and fixed to the under side of the flange 38 is the switch means B. The switch means B and C are similar in construction and the switch mechanisms thereof are enclosed in casings 65 and 66 respectively. The casings 65 and 66 each have an open side which is disposed toward the flanges 38 and 37 respectively and the flanges form one side of the casings. The casings may be secured to the flanges by screws 67 or other suitable attaching means. The switch means B and C being the same in structure and operation, a description of one is deemed sufficient. Referring to Fig. 5 in which the switch means C is shown in detail, there is provided within the casing 66 and at one end thereof a supporting means preferably in the form of laterally spaced lugs or brackets 70 which are adjacent to but spaced from the lower edges of the casing. Extending longitudinally within the casing 66 there is an elongated supporting member 71 preferably of electric insulating material which extends at one end, as at 72, between the lugs 70, being pivotally secured thereto by a hinge member 73 of resilient sheet metal.

Mounted on the upper side of the hinge member 73 there is a U-shaped permanent magnet 74. Pivotally secured to the supporting member 71 at its end, opposite the magnet 74, there is a contact arm 75. The pivotal connection for the arm 75 is formed by a hinge member 76, such as a plate of resilient sheet metal riveted or otherwise secured to one end of arm 75 and secured by screws 70 to the end of the supporting member 71. The arm 75 carries a contact member 79 which is fixed to the free end of a leaf spring 80 extending longitudinally of the arm 75 and which is secured thereto. The contact member 79 extends toward the supporting member 71 and cooperates with a contact member 81 secured to the member 71. The contacts 79 and 81 are located between the poles of the magnet which tends to hold the contacts together. The lead wire 15 may be connected to the fixed contact 81 and the lead wire 16 to the movable contact arm 75. The wires 15 and 16 lead out of an outlet box 83 formed integral with the casing 66.

The supporting member 71 is provided with a guideway 84 extending transversely therethrough and having its longitudinal axis transverse to the arm 75. In the guideway 84 there is a longitudinally reciprocal actuated or thrust member 85, which projects at its ends from the opposite faces of the supporting member 71. The thrust member 85 is preferably in the form of a cylindrical rod having a conical or pointed end portion of which one end portion engages the underside of the contact carrying arm 75 adjacent its fulcrum so as to swing the arm 75 away from the member 71. The other end of the thrust member 85 is in alignment with and bears against the end of a rod 86, which rod has one end screw-threaded into or otherwise suitably fixed to a second rod 87, carried by the yoke 55. The rod 87 has one end bifurcated with the sides thereof extending on opposite sides of one of the arms 57 of the yoke 55 and which may be fixed thereto by means of a rivet 88, or other suitable means. The rod 87 is fixed to the flange or arm 57 of the yoke at a point between the pivot pins 62 and the transverse connecting side 56. To the other or oppositely disposed flange or arm 57 of the yoke is fixed a rod 90 which extends therefrom and downwardly through the flange 38 into the casing 65 of the switch means B. The switch means B has a thrust member 91 like the thrust member 85 of switch means C and which is similarly arranged with the switch mechanism within casing 65 to transmit movement of the float to open and/or permit closing of the switch. For a more detailed description of the switch mechanism reference may be had to my pending application on electric switches, Serial No. 714,743, filed March 9, 1934.

In Fig. 3 of the drawings, the normal level of the water in the boiler 1 is indicated by the line A and below the normal level A there are indicated other levels B', B'', C' and C'' at which levels the control devices operate as hereafter described. When the level of the water in the boiler 1 reaches the level B' the float has moved upward and pivoted about its pivot points 62. The yoke 55, being on the other side of the pivot points, moves downward and acting through the movable thrust member 90 opens the switch of the switch means B against the force of the magnet opposing the opening of the switch. Upon opening the switch the solenoid 4 is deenergized and permits the valve to descend and stop flow of water to the boiler. When the float 3 moves upward and opens the switch of the switch means B, the yoke 55 moves away from the switch means C so that the magnet 74 thereof operates to hold the contact 79 and 81 together, and thus maintain the circuit closed to the burner motor 2. If for some reason the level of the water in the boiler decreases to the level C'', for example, because of failure of the water supply, or because of sticking of the valve in closed position, then the float 3 will have descended and pivoting about its pivot points 62 will move the yoke 55 upward against the opposing force of the magnet 74, of switch means C, and open the switch and thus cut out the motor 2 to discontinue the supplying of heat to the boiler. Since the solenoid 4 is in parallel circuit with the motor 2, it will be seen that the solenoid will also be deenergized upon decrease in water level to level C'' so that the valve will be in closed position. Upon resumption of water flow from the source of supply, water is admitted to the boiler 1 by opening the hand valve 6ª in the by-pass line 6. When the water rises to the level C', the float 3 having moved upward permits the magnet 74 of the switch means C to close the circuit to the burner motor 2 and thus resume the supplying of heat to the boiler 1. When the level of the water in the boiler reaches level B'' then the switch means B is permitted to close the circuit to the solenoid valve 4 which is then moved to open position. Upon resumption of normal operation of the solenoid valve 4, flow of water through the by-pass line 6 may be discontinued by closing the hand valve 6ª. It will be understood that for all levels above level C' the motor 2 is operating to supply heat to the boiler.

The heating system shown in Fig. 2 is the same as the system of Fig. 1 except that in the system of Fig. 2, the float 92 is located exteriorly of the boiler. The float 92 is enclosed in a casing 93 and the interior of the casing is in communication with the boiler through a connecting pipe 94. A pipe 95 provides communication between the interior of casing 93 and the interior of the boiler, the pipe 95 being connected to the top wall of the boiler or above the normal high level, in the usual manner.

What I claim and desire to secure by Letters Patent of the United States is:

1. In a heating system having a boiler adapted to contain water and a heat supplying means for the boiler, means for supplying water to the boiler, control means operable upon decrease in the level of the water below a predetermined level for discontinuing the supplying of heat to said boiler, and means controlled by said control means for preventing the admission of water to said boiler when the level of the water decreases to said predetermined level.

2. In a heating system having a boiler to which water flows, a float for said boiler operable in response to changes in the level of the water therein, electrically operated means controlling flow of water to said boiler and controlled by said float, said electrically operated means being operable upon a decrease in the level of the water in the boiler to a predetermined level to supply water to the boiler, means for supplying heat to said boiler, and a second electrically operated means for controlling the supplying of heat to said boiler and controlled by said float, said second-named electrically operated means being operable upon a decrease in the level of the water in said boiler below said predetermined level to stop the supply of heat to the boiler, said first-named electrically operated means being in parallel circuit with said second-named electrically operated means and being deenergizable when the supply of heat is discontinued for discontinuing the supply of water.

3. In a heating system having a boiler adapted to contain water and a heat supplying means for the boiler, electrically operated means for controlling the supplying of water to said boiler and operable upon decrease of the level of the water in the boiler to a predetermined level to admit water to the boiler, a second electrically operated means for controlling the supplying of heat to the boiler and operable upon a decrease in the level of the liquid in said boiler below said predetermined level to stop the supplying of heat to the boiler, a float for the boiler and operable in response to changes in the water level therein, a pivotal arm operated by said float, and a pair of switch means operated by said arm for controlling energization of said electrically operated control means, one of said switch means being operable to control both of said electrically operated means upon decrease in liquid level to said second-named predetermined level.

4. In a heating system having a boiler adapted to contain water and a heating means for the boiler, means operable upon a decrease in the level of the water in the boiler below a predetermined level for supplying water thereto, and means operable upon a decrease in the level of the water below said predetermined level for discontinuing both the supplying of heat and the supplying of water to the boiler.

5. In a heating system having a boiler adapted to contain water and a heating means for the boiler, means operable upon variations in the level of the water in the boiler to control the supplying of water thereto, and means operable upon a decrease in the level of the water to a predetermined level to discontinue the supplying of heat and the supplying of water to the boiler.

6. In a heating system having a boiler adapted to contain water and a heating means for the boiler, means for supplying water to the boiler, an electrically operated control device responsive to variations in the level of the water in the boiler for controlling the supplying of water thereto, and a second electrically operated control device in parallel circuit with said first-named control device and controlling said heat supplying means, said second-named control device being operable upon a decrease in the level of the water in the boiler to a predetermined level to stop the supplying of heat to the boiler and to deenergize said first-named control device to stop flow of water to the boiler.

7. In a heating system having a boiler for containing water and a heat supplying means therefor, means for supplying water to said boiler, means for controlling the supplying of water to said boiler, means operable within predetermined liquid levels for normally controlling said control means, and means operable upon a decrease in the level of the liquid to a predetermined level below said first-named predetermined levels for discontinuing both the supplying of heat and the supplying of water to said boiler.

8. In a heating system having a boiler for containing water and a heat supplying means therefor, means for supplying water to said boiler, a float operable in response to changes in liquid level in said boiler, and a switch means operable by said float upon decrease in the level of the water to a predetermined level for discontinuing both the supplying of heat and the supplying of water to said boiler.

EARNEST J. DILLMAN.